US007233565B2

(12) United States Patent
Yamaga et al.

(10) Patent No.: US 7,233,565 B2
(45) Date of Patent: Jun. 19, 2007

(54) OPTICAL RECORDING MEDIUM

(75) Inventors: Kenji Yamaga, Chuo-ku (JP); Tsuyoshi Komaki, Chuo-ku (JP)

(73) Assignee: TDK Corporation, Tokyo (JP)

( * ) Notice: Subject to any disclaimer, the term of this patent is extended or adjusted under 35 U.S.C. 154(b) by 592 days.

(21) Appl. No.: 10/487,406

(22) PCT Filed: Aug. 21, 2002

(86) PCT No.: PCT/JP02/08400

§ 371 (c)(1),
(2), (4) Date: Feb. 23, 2004

(87) PCT Pub. No.: WO03/017267

PCT Pub. Date: Feb. 27, 2003

(65) Prior Publication Data

US 2004/0208107 A1 Oct. 21, 2004

(30) Foreign Application Priority Data

Aug. 21, 2001 (JP) ............................ 2001-250215

(51) Int. Cl.
*G11B 7/24* (2006.01)

(52) U.S. Cl. .................. 369/275.1; 369/288; 369/286; 369/94

(58) Field of Classification Search ................ 369/288, 369/286, 283, 94, 275.2, 275.3, 275.1, 275.4; 428/64.1–64.4, 694 R, 694 SL
See application file for complete search history.

(56) References Cited

U.S. PATENT DOCUMENTS 5,305,303 A * 4/1994 Akahira et al. .......... 369/275.4
5,846,626 A * 12/1998 Kashiwagi et al. ........ 428/64.1
7,106,687 B1 * 9/2006 Richter et al. .............. 369/286
7,136,349 B2 * 11/2006 Nishiuchi et al. ........ 369/275.4

FOREIGN PATENT DOCUMENTS

| | | |
|---|---|---|
| JP | A 58-137146 | 8/1983 |
| JP | A 60-246039 | 12/1985 |
| JP | A 4-105823 | 9/1992 |
| JP | A 6-76384 | 3/1994 |
| JP | A 8-235638 | 9/1996 |
| JP | A 10-302309 | 11/1998 |
| JP | A 11-31337 | 2/1999 |
| JP | A 11-86355 | 3/1999 |
| JP | A 11-86356 | 3/1999 |
| JP | A 11-203724 | 7/1999 |
| JP | A 2000-235733 | 8/2000 |

* cited by examiner

*Primary Examiner*—Ali Neyzari
(74) *Attorney, Agent, or Firm*—Oliff & Berridge, PLC

(57) ABSTRACT

An increase in cost is minimized while realizing larger capacity. An optical disc 102 includes, from the bottom of the drawing: a substrate 104; a first information recording layer 108 formed on the substrate 104; and a first light transmission layer 110 having a thickness of about 20 μm formed on the first information recording layer 108. A second information recording layer 114 is formed on the first light transmission layer 110, and a second light transmission layer 116 having a thickness of about 90 μm is formed on the second information recording layer 114. A laser beam La is irradiated from the side of the second light transmission layer 116 to allow recording and/or reading of an information signal on/from the first and second information recording layers 108 and 114.

9 Claims, 11 Drawing Sheets

(A)

(B)

(C)

OPTICAL RECORDING MEDIUM

TECHNICAL FIELD

The present invention relates to an optical recording medium, in particular, an optical recording medium capable of realizing the increase in recording capacity at low cost.

BACKGROUND ART

As a form of optical recording media for audio and video and other optical recording media for recording various information, for example, an optical disc, on which information signals are written by embossed pits, is widely used. The most basic form of optical disc is shown in FIG. 12. This optical disc 2 comprises an information recording layer 8 having a reflective film 6 on a light transmission molded substrate (supporting plate) 4. A protective layer 12 made of an UV curable resin or the like is formed thereon. For this optical disc 2, a laser beam La is irradiated on the side of the molded substrate 4 acting as a light transmission layer so as to read an information signal from the information recording layer 8.

A recording density of the optical disc 2 can be increased as a spot diameter of the used laser beam La is reduced. The spot diameter is proportional to: λ/NA (λ: a wavelength of a laser beam, NA: a numerical aperture of an objective lens). Therefore, in order to reduce the spot diameter, it is necessary either to reduce the wavelength λ of the laser beam La or to increase the numerical aperture NA of the objective lens.

As the wavelength λ of the laser beam La, a wavelength of 780 nm is used for CDs, whereas a wavelength of 650 nm is used for DVDs. For the future, a wavelength in the vicinity of 400 nm corresponding to a blue laser is expected for use. The spot diameter is reduced by the amount of a decrease in wavelength, so that a recording density is increased.

On the other hand, coma aberration is increased as the numerical aperture NA is increased. In order to keep coma aberration small even with the increased numerical aperture NA, it is necessary to reduce a thickness of the light transmission layer (the molded substrate 4) through which the laser beam La passes.

Conventionally, as the light transmission layer (the molded substrate 4) of the optical disc 2, a molded product made of a resin formed by injection molding or the like is frequently used. By this fabrication method, however, it is difficult to fabricate the molded substrate 4 to have a smaller thickness than that of the currently used DVDs with good accuracy using the current technique. More specifically, in the optical disc 2 having a structure using the molded substrate 4 as a light transmission layer as shown in FIG. 12, a technique of increasing a recording density with a higher NA of the laser beam La to increase the capacity reaches the limit in the present state in view of the fabrication technique.

To cope with this, two approaches of improvement techniques have been proposed.

The first approach of improvement consists in increase in capacity by multiplication of the number of information recording layers.

For example, a DVD-9 has a double-layered information recording layer in a structure as shown in FIG. 13. More specifically, a first information recording layer 32 is formed on an upper surface of a first molded substrate (light transmission layer) 30 and then is covered with a translucent film (translucent reflective layer) 34. In the completely same manner, a second information recording layer 38 is also formed on an upper surface of a second molded substrate 36 (in the drawing, being oriented downward) and is then covered with a reflective film (reflective layer) 40. The first substrate 30 and the second substrate 36 are bonded with each other through transparent bonding means (light transmission layer) 42. By irradiation of the laser beam La, an information signal is read from the first and second information recording layers 32 and 38 through the first molded substrate 30. As a result, the capacity can be increased by increasing the number of information recording layers (doubling a substantial area of the information recording layers).

On the other hand, the second approach of improvement mainly consists in further increasing the NA of the laser beam to increase a recording density of information signals in the information recording layer, thereby increasing the capacity. For example, the related art is disclosed in Japanese Patent Laid-Open Publications Nos. 1997-235638, 2000-203724, and the like. Specifically, as shown in FIG. 14, a molded substrate 50, which does not required to transmit any light, is formed by injection molding to have a large thickness as a base of a disc body. Next, an information recording layer 54 having a reflective layer 52 is formed on the molded substrate 50. An extremely thin (at the maximum, about 300 μm) light transmission layer 56 is deposited thereon by means such as attachment of a light transmission sheet, resin coating through spin coating or the like.

The laser beam La is irradiated on the side of the thin light transmission layer 56 to record and/or read information on and/or from the information recording layer 54. In this manner, it is possible to form the thinner light transmission layer 56 while ensuring the entire strength on the side of the molded substrate 50. Therefore, a higher density (larger capacity) can be achieved by the approach of further increasing the NA of the laser beam.

Under the actual conditions, however, each of the above-described first and second approaches of improvement techniques still has various problems.

For example, in "multiplication of the number of information recording layers" corresponding to the above-described first approach of improvement, it is certain that substantial enlargement of the area of the information recording layers is made possible owing to multiplication of the layers. However, access to each of the information recording layers is achieved through the thick molded substrate 36 as in the conventional case. Therefore, the problem that it is hard to achieve a higher density for each layer still subsists. More specifically, capacity is expected to be increased only by the amount of increase in area achieved by multiplication of the layers.

On the other hand, for the approach of improvement that "density (capacity) for each layer is increased by increasing NA through a thin light transmission layer" corresponding to the second approach of improvement, various problems still remain in a concrete way to form thin light transmission layer.

Generally, as a method for forming the thin light transmission layer, a method of bonding a transparent sheet onto a molded substrate (or a supporting plate), a method of applying (coating) a resin by spin coating and the like have been proposed.

However, the method of bonding a transparent sheet is likely to have elevated fabrication cost because strict optical characteristics of the sheet itself and thickness accuracy are required. Moreover, even if the thickness accuracy of the transparent sheet is good, an uneven thickness or uneven application of an adhesive changes the optical characteristics to degrade the disc characteristics in some cases. Thus, high accuracy is also required for the application of an adhesive. Accordingly, under the actual conditions, many problems remain in this method.

The method of forming a thin light transmission layer by application of a resin through spin coating specifically consists in making a liquid UV curable resin (liquid to be applied) flow on a surface of a molded substrate (supporting plate) while rotating the molded substrate with a spindle so that the resin is uniformly extended in accordance with the rotation of the molded substrate to coat the resin layer. Thereafter, the coated resin is irradiated with ultraviolet rays so as to be cured. According to this method, the conditions such as a thickness of the coating can be adjusted by controlling a rotation speed of the spindle, application time and a viscosity of the application liquid.

However, this method has a problem in that the uniformity of the surface of the coating film is difficult to keep in such a way that a concentration (raise) of the application liquid is likely to occur, in particular, in the vicinity of the outer periphery. The raise does not become a serious problem in the case where there is a relatively large distance between a laser optical system and a disc such as a conventional CD or DVD. However, under the conditions where a gap between a laser optical system and a disc is reduced by a higher NA, it becomes an unignorable obstacle.

In the case where a relatively thick (for example, 100 μm) coating layer is formed, in particular, a thickness or a radial width of the raise becomes remarkably large to penetrate into an information recording area in some cases. Therefore, there is a possibility that a recordable area may be decreased to impair the recording/reading of information signals if no countermeasure is taken. Moreover, it also causes the collision of a laser optical system against a disc in some cases.

Regarding a treatment of the raise or the maintenance of smoothness of the coating surface, various proposals for ways of coping with them have been made in many documents, for example, Japanese Patent Laid-Open Publications Nos. 1999-203724, 1999-86355, 1999-86356, and the like. However, this signifies, in other words, "some measure" is necessarily needed irrespective of a concrete method thereof. Correspondingly, a fabrication process is complicated while cost is increased.

DISCLOSURE OF THE INVENTION

The present invention is to solve such conventional problems at a time by "a leap of idea" and has an object of providing an optical recording medium capable of minimizing the increase in cost while obtaining remarkable effects in "increase in capacity."

The inventors of the present invention have solved the above described various problems at the same time by proposing an optical recording medium having a structure according to the following (1).

(1) An optical recording medium comprising: a substrate; a first information recording layer formed on the substrate; a first light transmission layer formed of a resin on the first information recording layer to have a thickness of 40 μm or less; a second information recording layer formed on the first light transmission layer; and a second light transmission layer formed of a resin on the second information recording layer to have a thickness of 170 μm or less, wherein a laser beam is irradiated on a side of the second light transmission layer so as to allow recording and/or reading of an information signal on/from the first and second information recording layers.

As described above, a method of coating the information recording layer having a reflective layer with a resin at a small thickness by, for example, spin coating and irradiating a laser beam of a high NA on the (thin) resin-coating layer as a light transmission layer is extremely favorable method in view of its capability of remarkably improving a recording density for each layer.

In the case where the thin light transmission layer "alone" is to be formed, each of a method of bonding a transparent sheet and a resin coating method still has many problems in terms of technique and cost as described above.

In the present invention, this problem is solved by a reversal and progressive idea of additionally forming the second information recording layer on the upper surface of the light transmission layer.

More specifically, in the case where the second information recording layer is further formed (transcribed) on the upper surface of the light transmission layer, a step of pressing the upper surface of the light transmission layer is involved in the process of transcribing the second information recording layer. In the present invention, this step also serves as "means of ensuring the flatness of the upper surface of the first light transmission layer."

In the case where a resin for forming the first light transmission layer is enclosed, for example, in a space interposed between the molded substrate (or the supporting plate) and a stamper, it is not necessary to use a transparent sheet. Moreover, poor smoothness of the upper surface of the coating layer or the generation of a raise, which was conventionally inevitable, never occurs. More specifically, owing to the function of the stamper for transcribing the second information recording layer (in other words, in the course of realization of further increase in capacity), various inconveniences, which are conventionally present in an inevitable manner in formation of the first light transmission layer, can all be eliminated.

Furthermore, in the present invention, the second information recording layer is also irradiated with the laser beam through the second light transmission layer of 170 μm or less. As a result, both the first and second information recording layers are capable of recording at a high density based on a higher NA of a laser beam realized by the thin light transmission layer.

Obviously, the second light transmission layer must be formed on the second information recording layer in the present invention (more specifically, the invention according to the above-described (1), in particular). Thus, in formation of the second light transmission layer, inconveniences similar to those in the conventional case (basically) remain.

Nonetheless, the present invention has satisfactory advantages. The reason for this is as follows.

Specifically, in the optical recording medium according to the structure described in the above (1), both the first and second information recording layers have such a structure that the laser beam is irradiated on the side of the thin light transmission layers. Therefore, a recording density for each layer can be increased. As a result, the increase in capacity as a whole can be realized, as compared with each of the improved optical recording media which have conventionally been proposed as shown in FIG. 13 or FIG. 14. Thus, its added value is extremely elevated.

Nonetheless, as described above, it is possible to easily form the first light transmission layer on the first information recording layer with few technical obstacles. Therefore, the cost is substantially hardly increased thereby. In other words, the optical recording medium realizes large capacity, which has not ever been achieved, at almost the same cost as conventional one.

Specifically, even if a similar burden in view of the step and the cost as that on the conventional light transmission layer (the light transmission layer 56 in FIG. 14) is present in formation of the second light transmission layer, the burden is "relatively" reduced in a significant manner as compared with a conventional product having the same burden in fabrication of a single-layered disc. The invention according to (1) by itself has a remarkable effect.

Moreover, the inventors of the present invention have developed the following structures as described in (2) to (6) as further improved structures. As described below in detail, by using the structures in (2) to (6), an optical recording medium, in which any inconvenience scarcely occur in formation of the second light transmission layer, can be obtained.

(2) In the optical recording medium in the above-described basic invention (1), the optical recording medium is characterized in that a portion of the upper surface of the first light transmission layer, corresponding to an outer radial portion of the information recording area of the second information recording layer, is biased toward the substrate from a surface corresponding to the information recording area.

(3) In the above-described (2), the optical recording medium is characterized in that the bias of the upper surface of the first light transmission layer is inclined toward the substrate in such a manner that a thickness of the first light transmission layer is gradually reduced in an outer radial direction.

(4) In the above-described (2) or (3), the optical recording medium is characterized in that a portion of the upper surface of the substrate, corresponding to an outer radial portion of the information recording area of the first information recording layer, is biased toward inside of the substrate from the surface corresponding to the information recording area.

(5) In the above-described (4), the optical recording medium is characterized in that the bias of the upper surface of the substrate is inclined toward the inside of the substrate in such a manner that a thickness of the substrate is gradually reduced in an outer radial direction.

(6) In any one of the above described (1) to (5), the optical recording medium is characterized in that each of the first and second light transmission layers is an UV curable resin.

Furthermore, the present invention takes advantage of the flexibility of the structure to form the structure in (7) to (9) so as to easily obtain an optical recording medium having three or more layers.

(7) An optical recording medium comprising: a substrate; a first information recording layer formed on the substrate; a first light transmission layer formed of a resin on the first information recording layer to have a thickness of 40 μm or less; a second information recording layer formed on the first light transmission layer; a second light transmission layer formed of a resin on the second information recording layer to have a thickness of 40 μm or less; . . . ; an n-th information recording layer formed on an (n−1)-th light transmission layer; and an n-th light transmission layer formed of a resin on the n-th information recording layer to have a thickness of 170 μm or less, wherein a laser beam is irradiated on a side of the n-th light transmission layer so as to allow recording and/or reproduction of an information signal on/from the first, second . . . and n-th information recording layers, and wherein n is an integer of 3 or larger.

(8) In the above-described (7), the optical recording medium is characterized in that at least a portion of the upper surface of the (n−1)-th light transmission layer, corresponding to an outer radial portion of the information recording area of the (n−1)-th information recording layer, is biased toward the substrate from a surface corresponding to the information recording area.

(9) An optical recording medium characterized in that two optical recording media according to any one of the above-described (1) to (8) are prepared and bonded to each other so that their substrates face inside, whereby the laser beam is irradiated on both sides of the disc to allow recording and/or reading of an information signal on/from the respective sides.

Since any of the multilayered optical recording media obtained by the structures in (7) to (9) has access from the side of the light transmission layer which is formed extremely thin (in contrast with a conventional recording medium in which laser is irradiated through a thick molded substrate), a recording density for each layer is high owing to a higher NA. Therefore, a remarkable increase in capacity as compared with a conventional case can be realized.

Moreover, the above-described set value for a thickness of each of the light transmission layers in the present invention, in particular, a set value of a thickness of each layer where a thickness of the uppermost light transmission layer (the closest to the beam incident side) is larger than those of the other light transmission layers is obtained in view of design of an optical system in recording and/or reading of the optical disc and the like.

In the present invention, a concrete way of forming the first and second light transmission layers, the first and second information recording layers and the like is not particularly limited. As described below, various methods are conceivable for formation of these layers. By each of the methods, a merit (peculiar to the present invention) can be obtained.

BEST MODE FOR CARRYING OUT THE INVENTION

Hereinafter, exemplary embodiments of the present invention will be described in detail with reference to the drawings.

Figure 1:
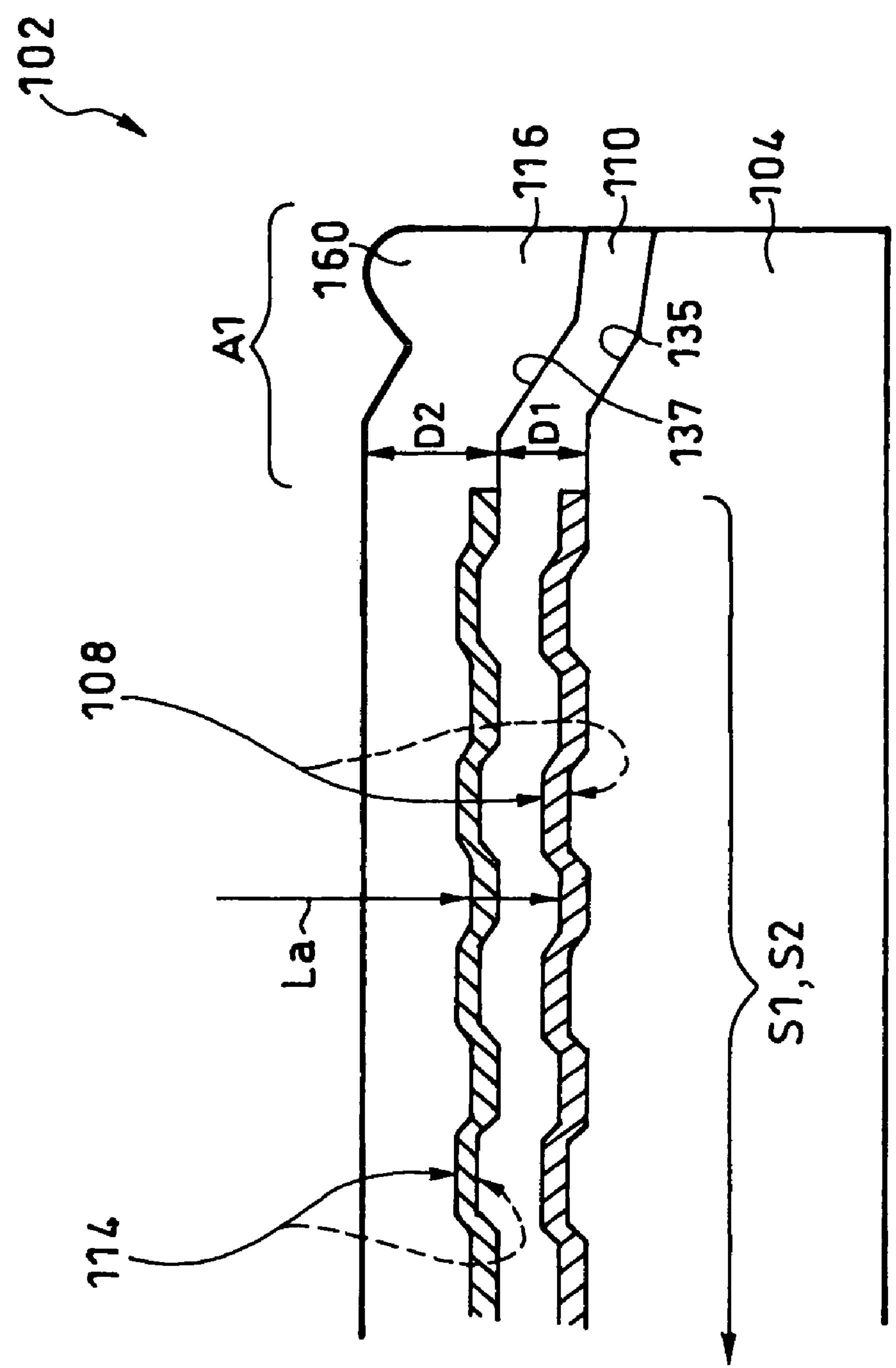
FIG. 1 is an enlarged cross-sectional view of a substantial part, schematically showing a structure in the vicinity of an outer peripheral portion of an optical disc to which the present invention is applied.

FIG. 1 schematically shows a cross section of an optical disc (optical recording medium) according to the first embodiment of the present invention. This optical disc 102 comprises, from the bottom in the drawing: a substrate (molded substrate: supporting plate) 104; a first information recording layer 108 formed on the substrate 104; and a first light transmission layer 110 formed on the first information recording layer 108. A thickness D1 of the first light transmission layer 110 is about 20 μm. A second information recording layer 114 is further formed on the first light transmission layer 110. A second light transmission layer 116 is formed on the second information recording layer 114. A thickness D2 of the second light transmission layer 116 is about 90 μm. The laser beam La is irradiated on the side of the second light transmission layer 116 so as to record and/or read an information signal on/from the first and second information recording layers 108 and 114. In an outer peripheral portion A1 of each layer in the optical disc 102, a predetermined curved pattern is formed.

Hereinafter, each part will be described in detail.

The structure of the substrate 104 and the first information recording layer 108 will be first described.

Figure 14:
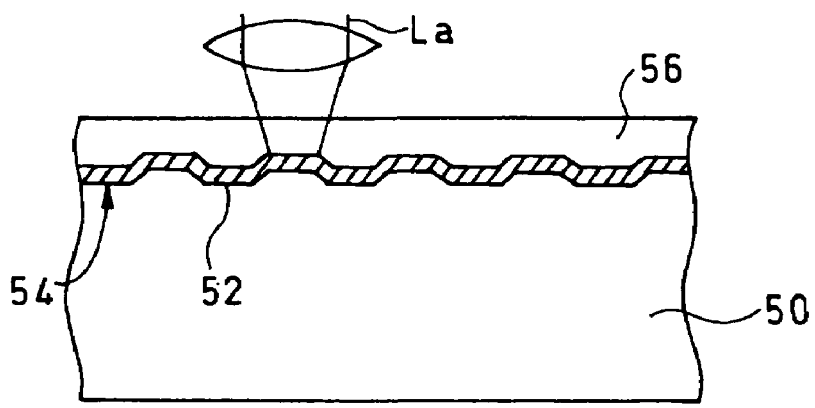
FIG. 14 is a partially enlarged cross-sectional view showing a conventional example of type in which a laser beam is irradiated on the side of a thin light transmission layer.

This structure is basically similar to that of the molded substrate 50, the reflective layer 52 and the information recording layer 54 in a conventional example that has already been described by using FIG. 14. As a concrete fabrication method, some methods have been proposed at present. Herein, this is formed by the procedure as shown in FIG. 2.

Figure 2:
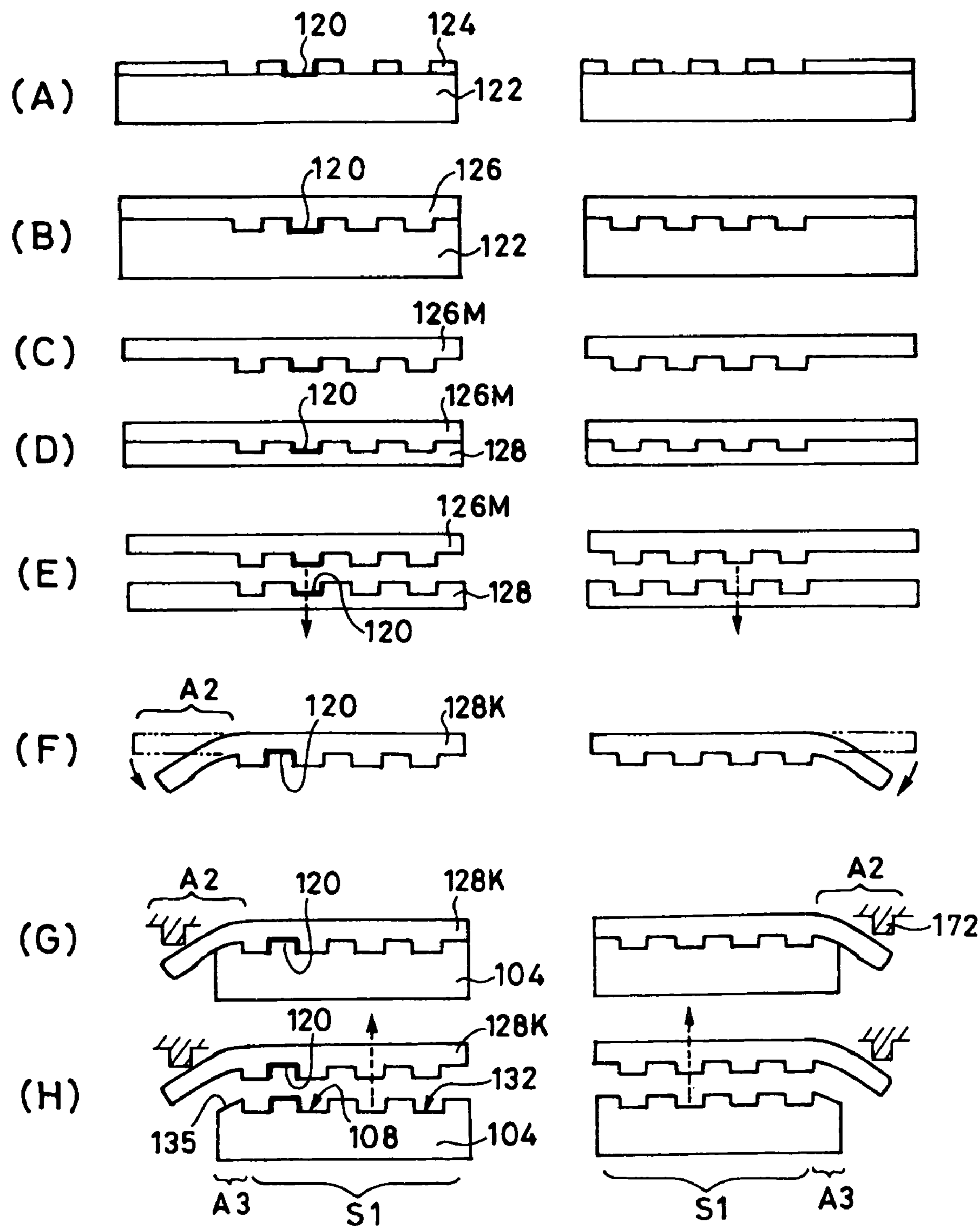
FIG. 2 is a process chart showing the procedure of fabricating a substrate.

FIG. 2 shows an example where recording is performed only in grooves. The grooves correspond to concavity when a minute concavo-convex surface is viewed from the side close to a pickup. This groove extremely slightly meanders (wobbles) and is used as an address in recording (positional information on a blank disc). In FIG. 2, the reference numeral 120 in a heavy line denotes a portion where a wobble signal is formed.

For convenience, in this specification, a pattern of the first and second information recording layers 108 and 114 formed when viewed from the pickup in the ultimately obtained optical disc 102 is denoted as a positive pattern and a reversed pattern is denoted as a negative pattern. More specifically, the wobble signal 120 is present in a groove portion in the positive pattern while being present in a land portion in the negative pattern.

In FIG. 2, a photoresist layer (photosensitive material) 124 is first provided on a glass original disc 122 so as to be cut with a laser, thereby forming grooves (the positive pattern) with wobbles by development or the like (FIG. 2(A)). Next, an electrically conductive film is provided so as to form a nickel-plating layer 126 by so-called electrocasting (FIG. 2(B)).

Thereafter, the nickel-plating layer 126 is removed from the glass original disc 122 to perform a post-treatment, so that a so-called master stamper 126M having a negative pattern is completed (FIG. 2(C)).

Normally, in the case of the type of optical disc (conventional CDs or DVDs) in which access is made from the side of the substrate, the master stamper 126M is used or a mother disc (positive pattern) is produced from the master stamper 126M to produce a child stamper (negative pattern) therefrom so as to be used for production of a substrate having the positive pattern.

Figure 4:
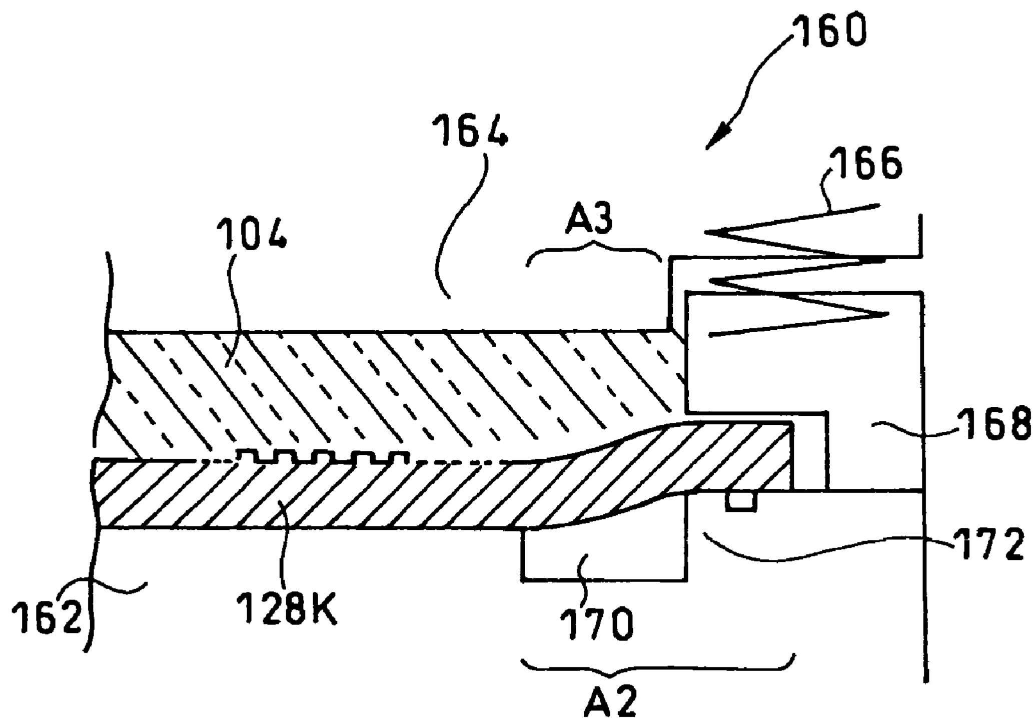
FIG. 4 is a cross-sectional view showing the schematic of a mold assembly for fabricating the substrate.

In this embodiment, however, the laser beam is irradiated not on the side of the substrate 104 but on the side of the second light transmission layer 116. Therefore, a mother stamper 128 having a positive pattern is produced from the master stamper 126M. This mother stamper 128 is completed by performing a surface treatment on the master stamper 126M, performing electroplating by electrocasting, and then removing the electroplating (FIGS. 2(D) and (E)). The outer peripheral portion A2 of the mother stamper 128 (in a practical sense, a copy thereof) is bent toward the substrate 104 so as to serve as a mother stamper for substrate 128K, which is fixed to a mold 160 as shown in FIG. 4. In FIG. 4, the reference numeral 162 denotes a stationary mold; 164 for a movable mold; 166 for a spring; 168 for an outer ring; 170 for a concave portion; and 172 for a ring-shaped convex portion. A step formed by the concave portion 170 and the ring-shaped convex portion 172 maintains the bend of the outer peripheral portion A2 of the mother stamper for substrate 128K. A resin constituting the substrate 104 is injected and molded in a space interposed between the movable mold 164 and the mother stamper for substrate 128K.

Returning to FIG. 2, when the resin constituting the substrate 104 is made to fill the mold 160 and is then removed while maintaining the bend of the mother stamper for substrate 128K in this manner, the substrate 104 having minute concave and convex portions (information recording area) 132 corresponding to the negative pattern of the first information recording layer 108 is completed (FIGS. 2(F) to (H)). In an outer peripheral portion A3 of the minute concave and convex portions 132 on the substrate 104, an inclined plane 135 corresponding to the above-described bend is formed. A thickness of the outer peripheral portion A3 is gradually reduced in an outer radial direction, as compared with the part of the information recording area 132.

Figure 3:
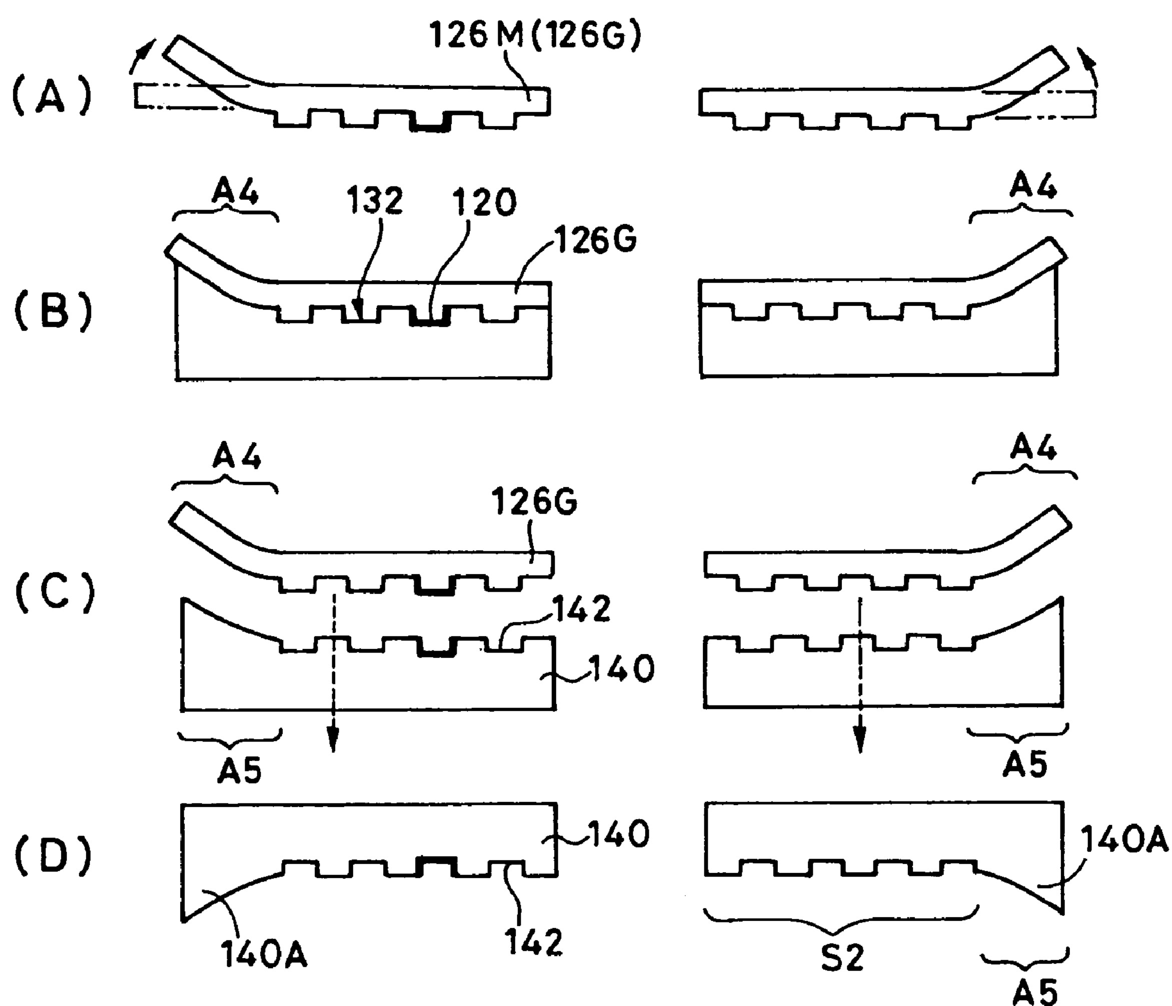
FIG. 3 is a process chart showing the procedure of producing a resin stamper.
Figure 5:
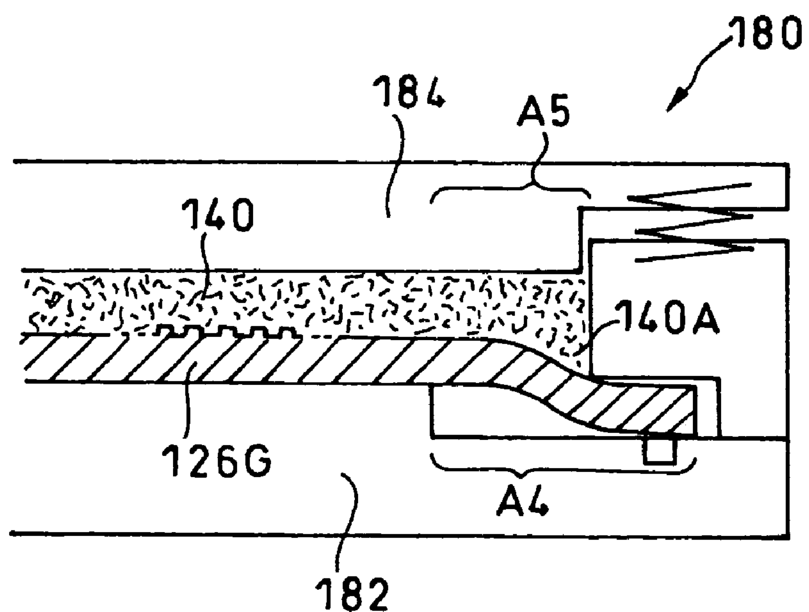
FIG. 5 is a cross-sectional view showing the schematic of a mold assembly for producing the resin stamper.

Herein, as shown in FIG. 3, a light transmission resin stamper 140 for forming the second information recording layer 114 is separately produced on the basis of the master stamper (or the child stamper) 126M. Specifically, an outer peripheral portion A4 of the master stamper (or the copy thereof) 126M is bent to the side opposite to the side where the minute concave and convex portions 132 are present so as to produce a master stamper for resin stamper (or a copy thereof) 126G. This stamper 126G is fixed to the side of the stationary mold 182 of the mold 180 as shown in FIG. 5. In this state, a resin for constituting the resin stamper 140 is injected and molded between the movable mold 184 of the mold 180 and the master stamper for resin stamper 126G, and then removed. As a result, the resin stamper 140 having minute concave and convex portions 142 corresponding to the positive pattern of the second information recording layer 114 is completed (FIGS. 3(B) and (C)).

Although the resin stamper 140 is a stamper, it is greatly characterized in having the positive pattern (that is, the wobble signal 120 is present in the groove) and a convex portion 140A projecting toward a surface for transcription (toward the first light transmission layer 110) in an outer peripheral portion A5 (FIG. 3(D)).

The shape itself of the minute concave and convex portions 142 formed on the resin stamper 140, for transcribing the second information recording layer 114, is similar to that of the minute concave and convex portions 132 formed on the mother stamper for substrate 128K for transcribing the first information recording layer 108.

In the case where the optical disc 102 according to this embodiment is constituted as a read-only optical disc, a reflective film is formed as the first information recording layer 108.

Next, the first light transmission layer 110 having a thickness of about 20 μm formed on the first information recording layer 108 will be described.

Figure 6:
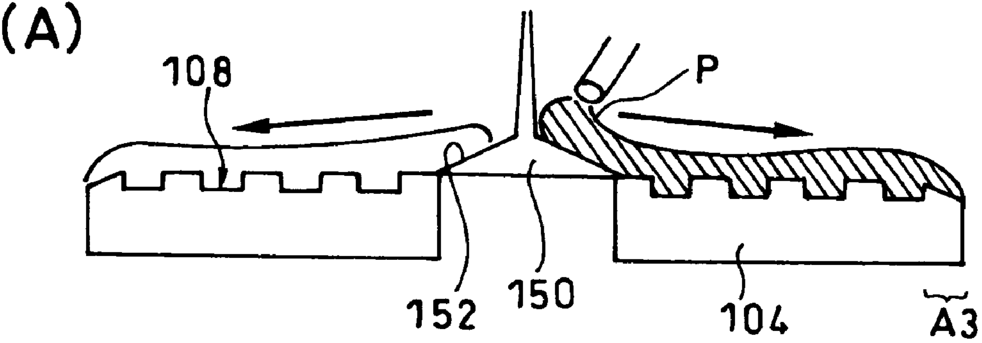
FIG. 6 is a longitudinal cross-sectional view schematically showing various methods for coating a resin constituting a first light transmission layer.
Figure 6:
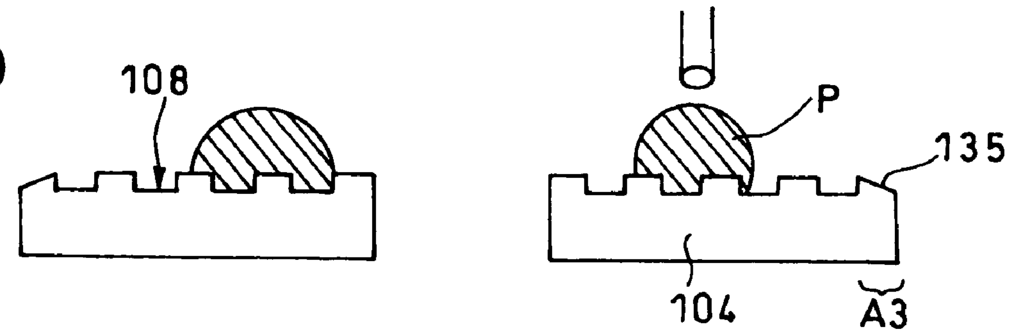
Figure 6:
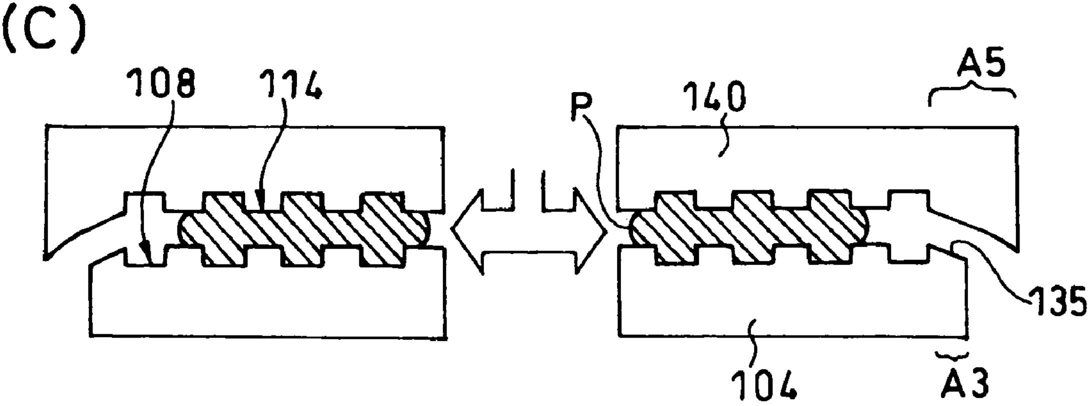

As a way of forming the first light transmission layer 110, several methods are conceivable. Three representative methods are shown in FIG. 6.

A method shown in FIG. 6(A) belongs to a spin coating method. A resin P for the first light transmission layer is dropped along the inclined plane 152 of a cap 150 so as to be spread over the entire surface of the first information recording layer 108 while rotating the substrate 104. The separately produced resin stamper 140 described above is placed thereon.

In a method shown in FIG. 6(B), in the approximately center in a radial direction on the first information recording layer 108, a predetermined amount of the resin P for the first light transmission layer is dropped in a ring shape. The above-described stamper 140 is pressed thereon. The dropped resin P for the first light transmission layer is spread over the entire surface of the first information recording layer 108 by the pressing force.

A method shown in FIG. 6(C) belongs to an injection method. The resin stamper 140 is placed in advance so as to be opposed to the first information recording layer 108. The resin P for the first light transmission layer is injected into a space between them 140 and 108.

In the case of any of the methods, the function of the resin stamper 140 can simultaneously realize the "shaping" of the upper surface of the first light transmission layer 110 and the "transcription" of the minute convex and concave portions 142 of the second information recording layer 114.

An UV curable type resin is used as the resin P to be sealed, and the resin stamper 140 is made of an light transmission material. As a result, ultraviolet rays irradiated on the side of the resin stamper 140 can fix the first light transmission layer.

Namely, in a transcription method which is generally called photo-polymer method, ultraviolet rays are usually irradiated on the side of a resin to be cured, that is, on the side of the substrate 104 in this embodiment.

In this embodiment, however, the reflective film which does not allow any beam to pass has already been formed on the first light transmission layer 110 on the side of the substrate 104 in the case where it is constituted as a read-only optical disc. In the case where it is constituted as a recordable optical disc, the first information recording layer 108 such as a reflective film or an optical recording film, which does not allow any beam to pass, has already been formed. Therefore, it is extremely inefficient to irradiate ultraviolet ray on the side of the substrate 104 (although it is not impossible). Accordingly, in this embodiment, a light transmission resin is used as a material of the resin stamper 140. Ultraviolet rays B are irradiated on the side of the resin stamper 140 so as to cure the first light transmission layer 110. Therefore, there is no waste in irradiation energy. Moreover, it is not necessary to particularly increase the size of an ultraviolet ray irradiation system. More specifically, the effect can be sufficiently obtained if a light transmission resin having a transmittance of 50% or more at the wavelength of 300 nm to 400 nm is used.

The present invention does not limit any specific fabrication methods. To cope with a similar problem, a fabrication method, in which, for example, the substrate 104 serving as a member on which transcription is performed can be heated by some sort of method and the first light transmission layer 110 is a thermoset resin, is effective in that the ultraviolet ray irradiation on the member on which transcription is performed is not needed.

In the industry (the field of optical recording media), however, equipment or know-how for curing an UV curable type resin with ultraviolet ray irradiation is well provided. In consideration of the possibility of low-cost fabrication and the reliability or the degree of freedom in formation of the minute concavity and convexity on the surface for transcription of the stamper and in formation of a biased shape on the outer peripheral side (in particular, for thermal deformation), it is preferred a fabrication method wherein a stamper of a "light transmission resin" which is excellent in formability is formed, and the first light transmission layer made of the UV curable type resin is cured by ultraviolet ray irradiation from the side of the stamper.

As shown in FIGS. 7(A) and (B), when ultraviolet rays are irradiated on the side of the resin stamper 140 to fix the first light transmission layer 110 in the above-described manner, minute concave and convex portions 142 corresponding to the negative pattern of the second information recording layer 114 are simultaneously formed on its upper surface. Therefore, when the resin stamper 140 is removed in this state, the minute concave and convex portions 142 corresponding to the negative pattern of the second information recording layer 114 remains on the uppermost part.

On the upper surface of (the negative pattern of) the second information recording layer 114, a translucent reflective film is formed in the case where it is constituted as a read-only optical disc. In the case where it is constituted as a recordable optical disc, a recording film or a dielectric film is formed in a translucent state so as to serve as a second information recording layer which does not allow beam to completely pass. They both have minute concavity and convexity as the second information recording layer 114 having the positive pattern when viewed from the side of the pickup.

On its upper surface, the second light transmission layer 116 of about 90 μm is formed. Several methods are conceivable as a way of forming the second light transmission layer 116. Herein, as shown in FIGS. 7(C) and (D), the fabrication by spin coating is employed.

Now, the shape of the outer peripheral portion of each layer will be described in detail.

As already described in the drawings so far, in this embodiment, the portion A3 on the upper surface of the substrate 104 corresponding to the outer radial portion of the information recording area S1 (the minute concave and convex portions 132) of the first information recording layer 108 is biased toward the inside of the substrate 104 so that a thickness of the substrate 104 in the portion A3 is smaller than that in the information recording area S1.

More specifically, the bias of the substrate 104 is formed by the bending shape of the outer peripheral portion A2 of the mother stamper for substrate 128K. The inclined plane 135 is formed to incline toward the inside of the substrate 104 so that the thickness of the substrate 104 is gradually decreased in the outer radial direction.

Figure 7:
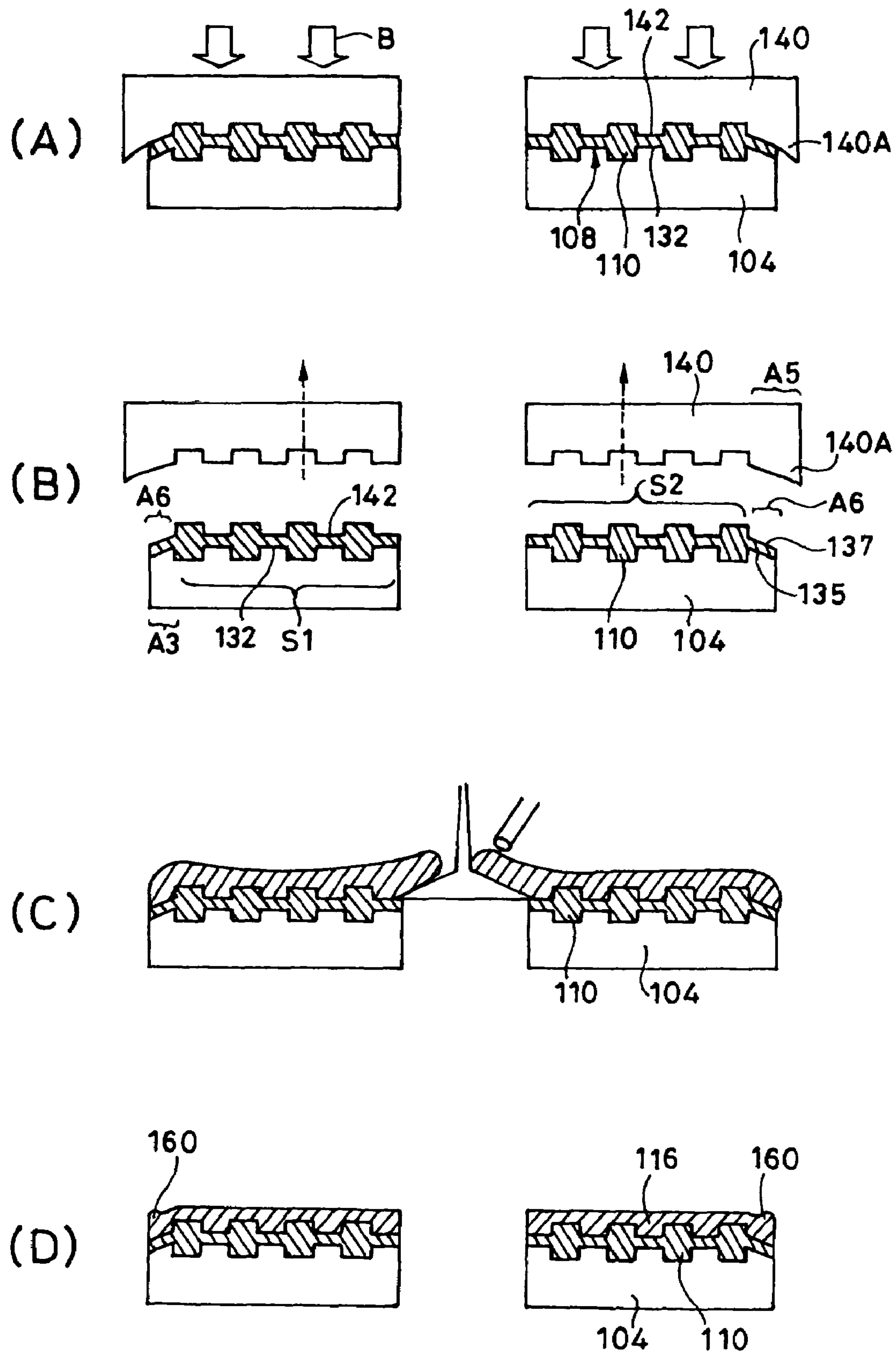
FIG. 7 is a process chart showing the fabrication of a second information recording layer on an upper surface of the first light transmission layer by the resin stamper and the shaping of the upper surface so as to further form a second light transmission layer.

On the other hand, a portion A6 corresponding to an outer radial portion of the information recording area S2 of the second information recording layer 114 on the upper surface of the first light transmission layer 110 is also biased so that the first light transmission layer 110 is gradually biased toward the substrate 104 in an outer radial direction from the portion of the information recording area S2. More specifically, as shown in FIGS. 3 and 7, the convex portion 140A is formed in a projecting shape in the outer peripheral portion A5 of the information recording area S2 in the second information recording layer 114 of the resin stamper 140 so as to form the basis. The first light transmission layer 110 has an inclined plane 137 gradually biasing toward the substrate 104 in an outer radial direction.

Therefore, if the second light transmission layer 116 is formed by spin coating on the first light transmission layer 110 on which the second information recording layer 114 is transcribed, the raise 160, which is conventionally inevitably present when the resin coating is performed by spin coating, is entirely absorbed by the inclined plane 137 in the outer peripheral portion of the first light transmission layer 110. Therefore, even if the raise 160 itself is present, it does not project beyond the information recording area surface of the second light transmission layer 116 (see FIGS. 7(D) and 1).

Accordingly, even without any post-treatments, the optical disc 102 without any particular inconvenience can be fabricated.

EXAMPLE 1

Herein, an experimental example for prevention of generation of a raise on the upper surface of the second light transmission layer 116 due to a bending shape of the outer peripheral portion (outer portion) of each layer will be described.

In this experiment, (as described above), the substrate 104 and the resin stamper 140 were fabricated by injection molding. The mother stamper for substrate 128K and the master or child stamper for resin stamper 126G, which were attached to the molds for molding 160 and 180, had a track pitch of 0.3 μm for groove recording.

As the substrate 104, using a polycarbonate resin (H4000-N282 fabricated by Mitsubishi Engineering-Plastics Corporation), the substrate 104 having an outer diameter of 12 cm and a thickness of 1.1 mm was molded at a mold temperature of 125° C., a resin melt temperature of 360° C. and a mold clamping force of 35 tons.

On the other hand, as the resin stamper 140, using an olefin resin (ZEONEX-E28R fabricated by Zeon Corporation), the resin stamper 140 having an outer diameter of 13 cm and a thickness of 1.0 mm was molded at a mold temperature of 125° C., a resin melt temperature of 370° C. and a mold clamping force of 35 tons. An olefin resin was used as a material of the resin stamper 140 in view of ensuring of the ease of removal after transcription of the second information recording layer 114, that is, in view of the characteristic that adhesion between the first light transmission layer 110 and the resin stamper 140 is smaller than that between the substrate 104 and the first light transmission layer 110, and the characteristic that a light transmittance at the above-described wavelength from 300 nm to 400 nm is 50% or more.

The outer peripheral shape of the substrate 104 is such that a thin-walled portion (inclination) starts from the position 1.0 mm away from the outer peripheral edge and a thickness of the thin-walled portion (the inclined plane 135) at the outer edge is 1.0 mm. The outer peripheral shape of the resin stamper 140 is such that a thickened portion starts at the position 1.0 mm away from the outer peripheral edge of the corresponding optical disc substrate and a thickness of the convex portion 140A at the outer edge is 1.1 mm.

When the above-described optical disc 102 was fabricated by using these substrate 104 and resin stamper 140, the raise 160 in the outer peripheral portion did not project beyond the surface of the second light transmission layer 116, corresponding to the information recording area S2, resulting in a concave state of 20 μm.

Figure 13:
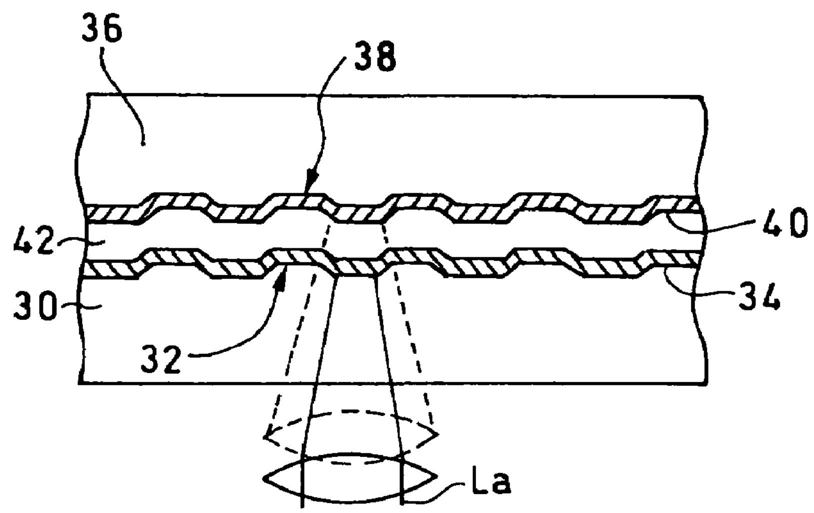
FIG. 13 is an enlarged cross-sectional view of a substantial part, showing a double-faced type optical disc obtained by bonding the structures shown in FIG. 12 with each other.

In this embodiment, since the first and second light transmission layers 110 and 116, through which the laser beam pass, are formed to have thicknesses of about 20 μm and 90 μm, respectively, coma aberration can be kept small even if the numerical aperture NA is increased. For improvement in recording density for each layer by increasing the NA of the laser beam, larger capacity can be realized as compared with a double-layered type in which the laser beam is irradiated on the side of the molded substrate 30 (the type in FIG. 13). Moreover, as compared with a conventional similar single-layered type (the type in FIG. 14), the capacity can be increased for the increase in the number of layers.

Moreover, even in the case where the second light transmission layer 116 is formed by spin coating, the raise 160 on the surface of the coating can be prevented from being noticeable as a raise on the surface of the disc, owing to the bending shape of the outer peripheral portion. Therefore, means for smoothing the upper surface of the second light transmission layer 116 is not particularly needed. Therefore, larger capacity and lower cost can be simultaneously achieved in a simple manner.

In the above-described embodiment, the thicknesses of the first and second light transmission layers 110 and 116 are about 20 μm and 90 μm, respectively. However, the thicknesses of the first and second light transmission layers according to the present invention are not limited thereto. In view of the reliability of fabrication of optical discs, however, the thicknesses of these light transmission layers are required to be several μm or more at the minimum. Moreover, in view of an optical system with a higher NA, it is preferred to keep the thicknesses to about 40 μm and 170 μm at the maximum, respectively. More preferably, the thicknesses are 30 μm and 130 μm or less, respectively.

Moreover, in the above-described embodiment, the outer peripheral portion of each layer is bent, so that even in the case where the uppermost second light transmission layer is formed by spin coating, attention has been paid not to bring about any particular inconveniences. However, in the case where the optical disc according to the present invention is fabricated, the bending structure is not necessarily essential.

As described above, conventionally, some methods or techniques for smoothing the upper surface of the resin coating by spin coating have already been proposed. For the formation of the second light transmission layer, the present invention does not forbid to use, for example, any one of these propositions.

Moreover, although the outer diameter of the resin stamper 140 is 13 cm in this example, a similar result can be obtained with the same outer diameter as that of the substrate 104, that is, 12 cm.

EXAMPLE 2

In accordance with the experiment, which was carried out by the inventors for comparison in parallel with the experiment in the above-described Example 1, the optical disc (102) was fabricated under the same conditions as those of the above-described Example 1 except that the combination was formed by the substrate having a plane outer peripheral portion (on which the curved pattern is not formed) (104) and the resin stamper (140). As a result, the raise (160) at the outermost periphery was in a convex state at 60 μm beyond the surface of the second light transmission layer 116 corresponding to the information recording area (S2). This state needs some sort of post-treatment because there is a possibility that the optical disc (102) and the pickup of the optical system collide with each other in this state.

Figure 8:
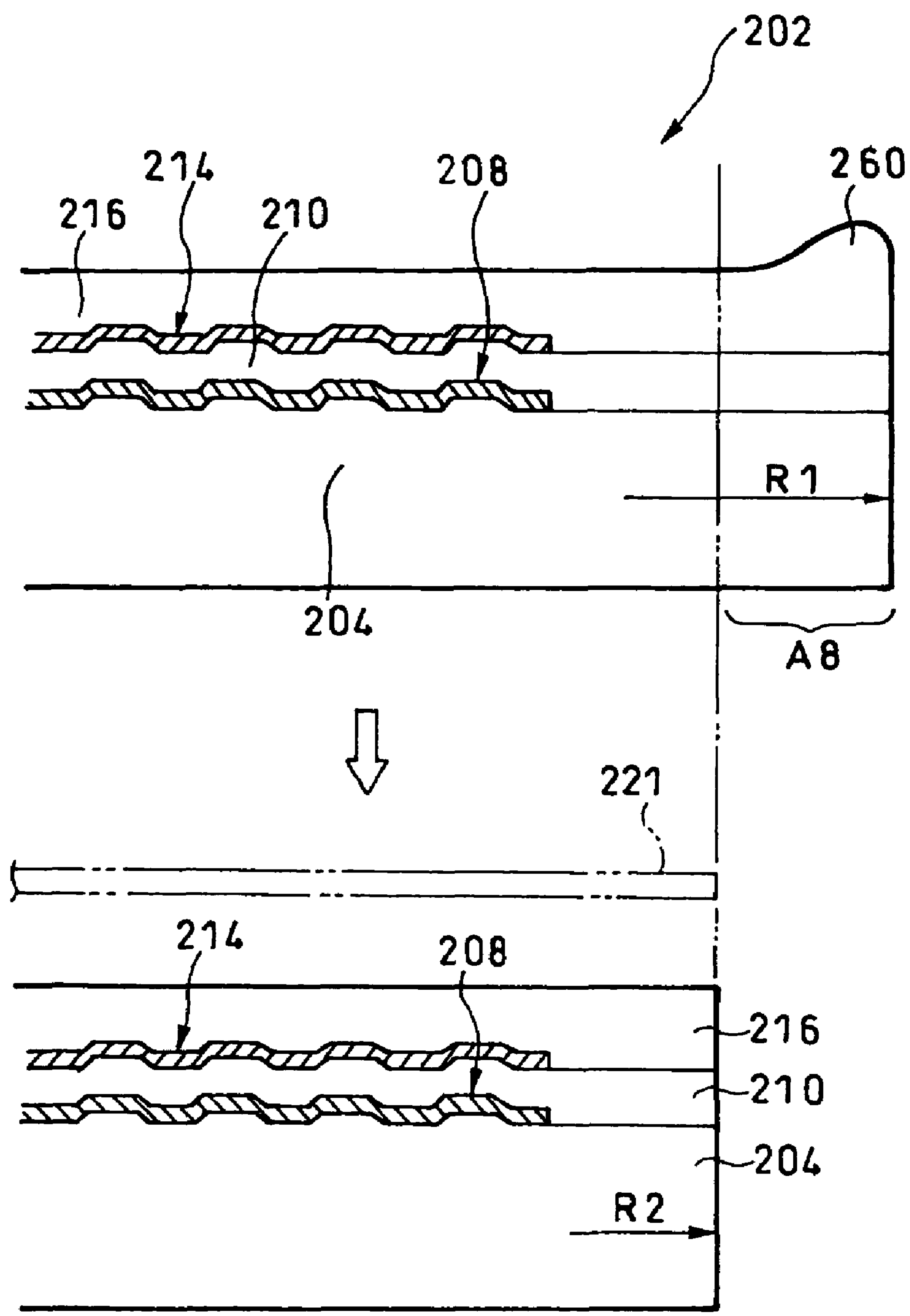
FIG. 8 is a cross-sectional view showing another exemplary method for ensuring the smoothness of the second light transmission layer.

However, as shown in FIG. 8, for example, if a technique for forming the optical disc 202 itself to have slightly larger size R1 than that of a final product and thereafter cutting an outer peripheral portion AB to obtain predetermined size R2 is employed, this inconvenience can be eliminated.

Moreover, the surface can alternatively be smoothed by placing a glass plate 221 having a smooth surface (see a phantom line in FIG. 8) as a dummy stamper on the upper surface of the second light transmission layer 216. Further alternatively, bonding using a resin sheet may be employed.

The optical disc according to the present invention has an apparently advantageous high added value over any conventional techniques for increasing the capacity. Moreover, the first light transmission layer can be fabricated without any technical problems. Therefore, there is substantially little increase in cost. Thus, even if the same measure as that in the conventional case is taken only for the second light transmission layer, a burden on this in view of cost is "relatively" remarkably reduced.

Thus, for example, in the case where a so-called top-grade version optical disc, for which higher reliability should be ensured, is to be fabricated, another method may appropriately be used for a treatment of the second light transmission layer.

The structure of each layer in FIG. 8 is similar to that in the previous embodiment except the presence/absence of the curved pattern. Therefore, the same or similar parts in the drawing are simply denoted by the reference numerals containing the same last double-digit numbers as those of the reference numerals in the previous embodiment, and the overlapping description thereof is omitted.

Figure 9:
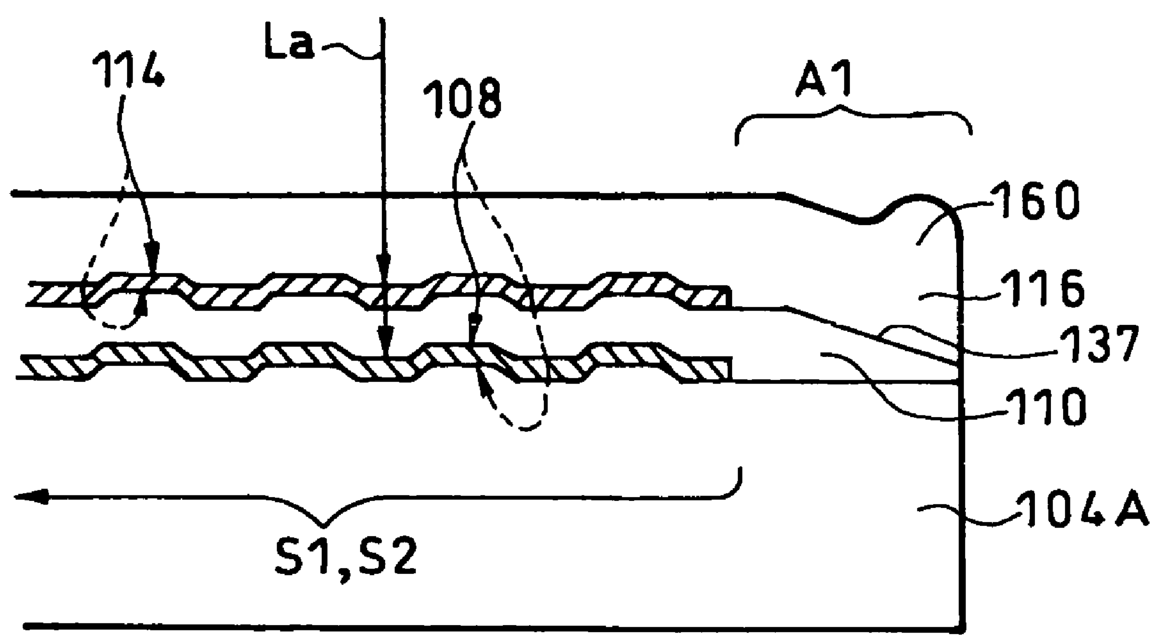
FIG. 9 is a cross-sectional view showing an example where concave portions are formed only on the upper face of the first light transmission layer.

Furthermore, in the above-described embodiment, the inclined plane 135 is formed not only on the upper surface of the first light transmission layer 110 but also in the outer peripheral portion of the upper surface of the substrate 104. However, as shown in FIG. 9, if only the biased portion (inclined plane) 137 is formed in the outer peripheral portion of the upper surface of the first light transmission layer 110, the raise 160 can be prevented from being generated on the upper surface of the second light transmission layer 116 under some conditions. Therefore, if only the biased portion is formed at least in the outer peripheral portion of the upper surface of the first light transmission layer 110, it is not necessarily required to form a biased portion in the outer peripheral portion of the underlying substrate 104A in some cases.

Moreover, the shape of the biased portion is not necessarily limited to a simple inclined plane. In summary, in view of the object of preventing the raise in the outer peripheral portion of the spin coated upper surface, it is apparent that a depth or a shape of the biased portion can be determined, for example, based on the results of the experiment which is conducted in order to smooth the spin coated surface as much as possible.

On the other hand, in the present invention, as means for smoothing and shaping the upper surface of the resin coating layer which is required to be formed thin, a further information recording layer is formed on the upper surface and a function of the stamper is utilized. Therefore, a multilayered recording medium having three or more layers can be easily fabricated by successively performing this technique.

Figure 10:
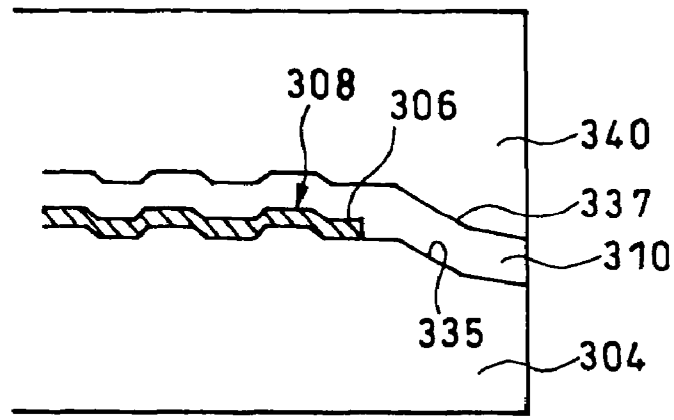
FIG. 10 is a process chart showing the procedure for fabricating a multilayered optical disc having three layers.
Figure 10:
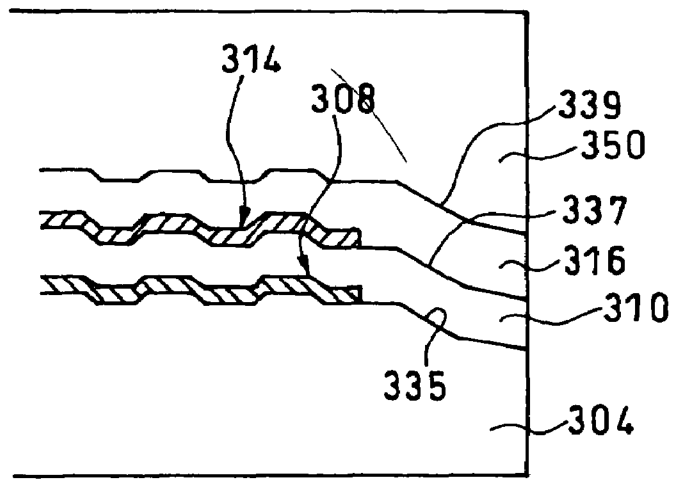
Figure 10:
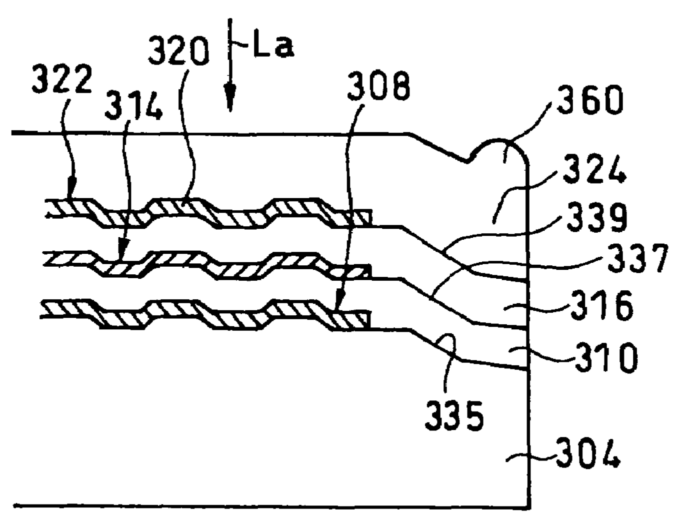

For example, in order to fabricating a triple-layered optical recording medium, as shown in FIG. 10, a substrate 304; a first information recording layer 308 formed on the substrate 304; a first light transmission layer 310 formed of a resin to have a thickness of 40 μm or less on the first information recording layer 308; a second information recording layer 314 formed on the first light transmission layer 310; a second light transmission layer 316 formed of a resin to have a thickness of 40 μm or less on the second information recording layer 314; a third information recording layer 322 formed on the second light transmission layer 316; and a third light transmission layer 324 formed of a resin to have a thickness of 170 μm or less on the third information recording layer 322, are sequentially provided so that the laser beam La is irradiated on the side of the third light transmission layer 324 to allow recording and/or reading of an information signal to/from the first, second and third information recording layers 308, 314 and 322.

For transcription of each of the information recording layers, similar resin stampers 340 and 350 to the above-described stamper 140 are respectively used. An inclined plane 339 is also formed on the upper surface of the second light transmission layer 316. A raise 360 is absorbed by the presence of the inclined plane 339.

Furthermore, in a more general expression, in order to fabricate an n-layered optical recording medium including three or more layers, a substrate; a first information recording layer formed on the substrate; a first light transmission layer formed of a resin to have a thickness of 40 μm or less on the first information recording layer; a second information recording layer formed on the first light transmission layer; a second light transmission layer formed of a resin to have a thickness of 40 μm or less on the second information recording layer; . . . ; an n-th information recording layer formed on an (n−1)-th light transmission layer; and an n-th light transmission layer formed of a resin to have a thickness of 170 μm or less on the n-th information recording layer, are sequentially provided, where n is an integer of 3 or larger, so that the laser beam is irradiated on the side of the n-th light transmission layer to allow recording and/or reading of an information signal to/from the first, second . . . and n-th information recording layers.

As in the case of two layers, even in the case of a multilayered structure, if a structure is such that an outer peripheral portion of an upper surface of the (n−1)-th light transmission layer is biased toward the lower layer, a raise, which is generated at the formation of the uppermost n-th light transmission layer by spin coating, can be prevented from being noticeable. However, in the case where a thickness of the (n−1)-th light transmission layer is too small (to absorb the raise), the outer peripheral portion is biased from the lower layer as in the above-described embodiment. If it is biased from the lower layer, a large bias (if required, a bias larger than the thickness of the (n−1)-th light transmission layer) can be formed on the upper surface of the (n−1)-th light transmission layer even if the (n−1)-th light transmission layer is thin. Accordingly, the raise generated at the formation of the n-the light transmission layer can be sufficiently absorbed.

Even in the case where the optical disc having three or more layers on one side, an allowable value of a thickness of each light transmission layer for disc formation is 170 μm or less, preferably, 130 μm or less for the n-th light transmission layer, 40 μm or less, preferably, 30 μm or less for the other light transmission layers. Therefore, there is no particular difference from the case of two layers.

In the case of three or more layers, however, if each of the light transmission layers is too thick, the position where the first information recording layer is formed is far from the end face on the beam irradiation side. Therefore, it is qualitatively preferred that a thickness is smaller than that of a double-layered optical disc. It can be considered that values smaller than the above-described values by 30 to 70% are practically allowable values, respectively.

Figure 11:
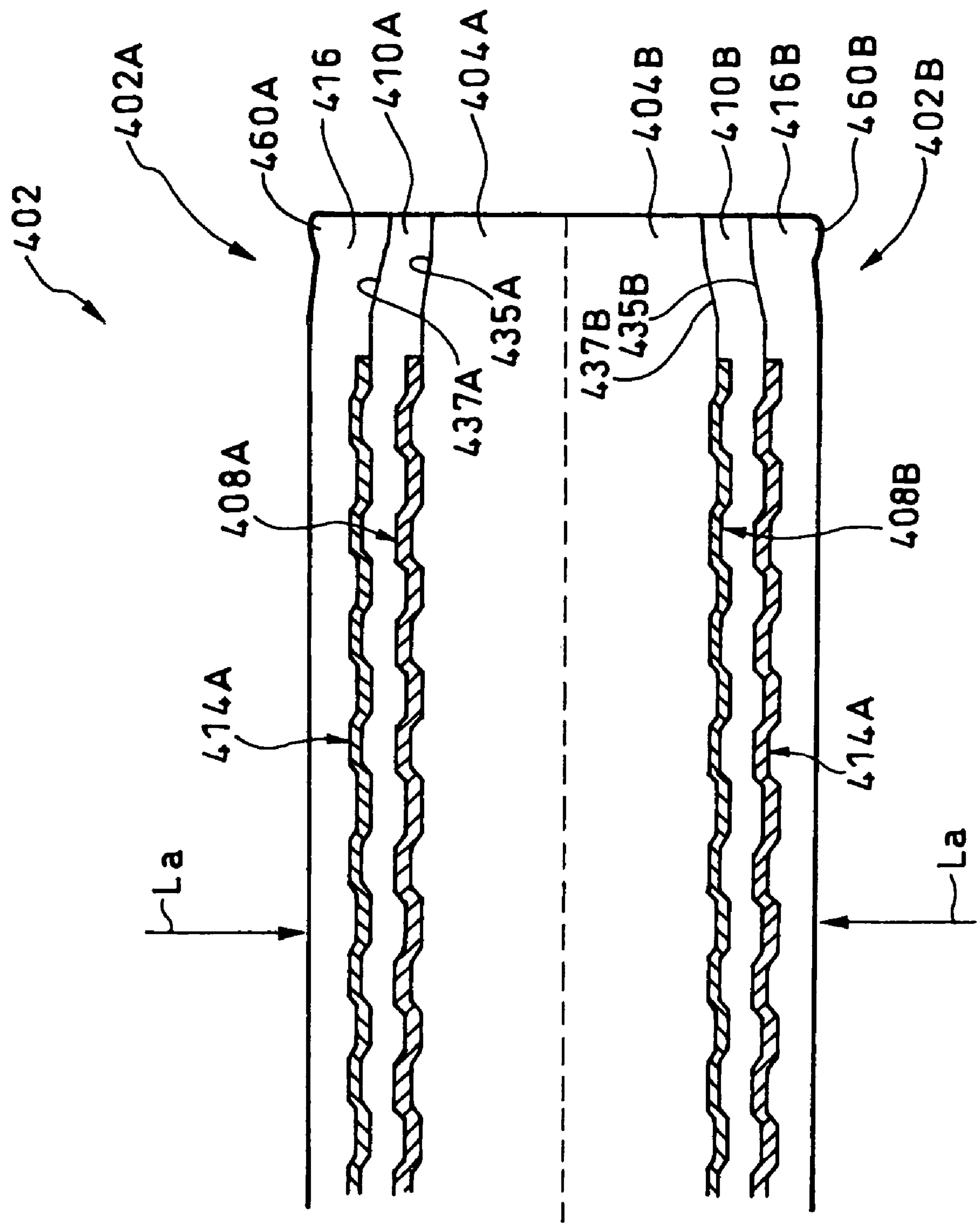
FIG. 11 is a partially enlarged cross-sectional view showing the structure of a double-faced multilayered optical disc to which the present invention is applied.
Figure 12:
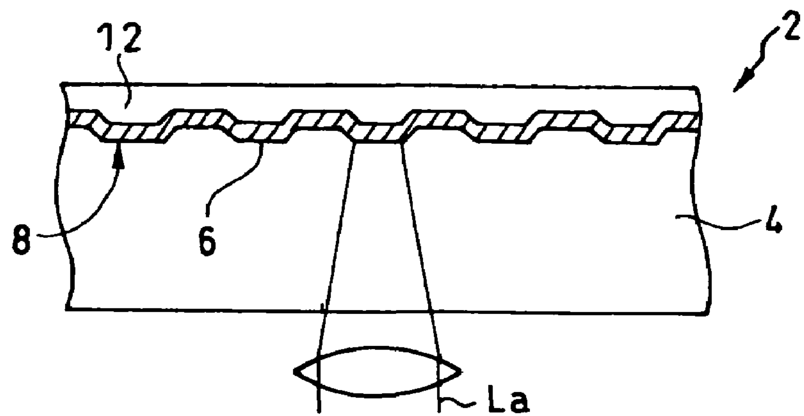
FIG. 12 is a partially enlarged cross-sectional view showing the structure of a conventional single-layered type optical disc.

In the last place, the present invention can also be modified as shown in FIG. 11. Namely, two multilayered recording media (402A and 402B) formed in the above-described manner are prepared. They are bonded with each other so that respective substrates 404A and 404B face each other inward. As a result, a double-faced multilayered optical disc 402, in which the laser beam La is irradiated on both faces of the disc 402 so as to allow recording and/or reading of an information signal on/from the respective sides.

If the substrates 404A and 404B are formed slightly thin (about 0.6 mm), a thickness of the optical disc 402 as a whole can be kept at the same as that of the above-described single-faced optical disc.

In the double-faced multilayered optical disc 402, in contrast to a conventional double-faced type optical disc, the access is made to each information recording layer from the side of the thin light transmission layer. Therefore, a recording density for each layer can be kept high at the level of the optical disc in FIG. 14. Moreover, the multilayer structure is achieved on one face. In addition, the multilayer structure is formed on both faces. Therefore, an optical disc of the largest capacity class at the present can be constituted.

Since the structure of each layer is similar to that of the previous embodiment, the same or similar parts in the drawing are simply denoted by the reference numerals containing the same double-digit numbers as those of the reference numerals in the previous embodiment and the overlapping description thereof is omitted.

INDUSTRIAL APPLICABILITY

According to the present invention, in order to form a light transmission layer thin to realize a much higher NA of a laser beam without any problems, smoothing of the upper surface of the light transmission layer, which is conventionally a bottleneck in fabrication, is realized by a reversal and progressive idea of forming a further information recording layer. Therefore, the excellent effects of obtaining an optical disc, in which larger capacity of an optical recording medium is realized while keeping cost down, can be obtained.

The invention claimed is:

1. An optical recording medium comprising: a substrate; a first information recording layer formed on the substrate; a first light transmission layer formed of a resin on the first information recording layer, the first light transmission layer having a thickness of 40 μm or less; a second information recording layer formed on the first light transmission layer; and a second light transmission layer formed of a resin on the second information recording layer, the second light transmission layer having a thickness of 170 μm or less, wherein a laser beam is irradiated on a side of the second light transmission layer so as to allow recording and/or reading of an information signal on/from the first and second information recording layers, wherein a portion of the upper surface of the first light transmission layer, corresponding to an outer radial portion of the information recording area of the second information recording layer, is biased toward the substrate from a surface corresponding to the information recording area.

2. The optical recording medium according to claim 1, wherein the bias of the upper surface of the first light transmission layer is inclined toward the substrate in such a manner that the thickness of the first light transmission layer is gradually reduced in an outer radial direction.

3. The optical recording medium according to claim 1, wherein a port ion of the upper surface of the substrate, corresponding to an outer radial portion of the information recording area of the first information recording layer, is biased toward inside of the substrate from the surface corresponding to the information recording area.

4. The optical recording medium according to claim 3, wherein the bias of the upper surface of the substrate is inclined toward the inside of the substrate in such a manner that a thickness of the substrate is gradually reduced in an outer radial direction.

5. The optical recording medium according to claim 1, wherein each of the first and second light transmission layers is an UV curable resin.

6. An optical recording medium sequentially comprising: a substrate; a first information recording layer formed on the substrate; a first light transmission layer formed of a resin on the first information recording layer, the first light transmission layer having a thickness of 40 μm or less; a second information recording layer formed on the first light transmission layer; a second light transmission layer formed of a resin on the second information recording layer, the second light transmission layer having a thickness of 40 μm or less; . . . ; an n-th information recording layer formed on an (n-1)-th light transmission layer; and an n-th light transmission layer formed of a resin on the n-th information recording layer, the n-th light transmission layer having a thickness of 170 μm or less, wherein a laser beam is irradiated on a side of the n-th light transmission layer so as to allow recording and/or reading of an information signal on/from the first, second . . . and n-th information recording layers, and wherein n is an integer of 3 or larger.

7. The optical recording medium according to claim 6, wherein at least a portion of the upper surface of the (n−1)-th light transmission layer, corresponding to an outer radial portion of the information recording area of the (n−1)-th information recording layer, is biased toward the substrate from a surface corresponding to the information recording area.

8. An optical recording medium characterized in that two optical recording media according to claim 1 are prepared and bonded to each other so that their substrates face inside, whereby the laser beam is irradiated on both sides of the disc to allow recording and/or reading of an information signal on/from the respective sides.

9. An optical recording medium characterized in that two optical recording media according to claim 6 are prepared and bonded to each other so that their substrates face inside, whereby the laser beam is irradiated on both sides of the disc to allow recording and/or reading of an information signal on/from the respective sides.

* * * * *